United States Patent
Yamagiwa et al.

(10) Patent No.: US 6,753,768 B2
(45) Date of Patent: Jun. 22, 2004

(54) AIR PRESSURE DETECTING DEVICE FOR WHEEL

(75) Inventors: Toshio Yamagiwa, Saitama (JP); Tomoyuki Harada, Saitama (JP); Osamu Bunya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 38 days.

(21) Appl. No.: 09/988,765

(22) Filed: Nov. 20, 2001

(65) Prior Publication Data

US 2002/0060626 A1 May 23, 2002

(30) Foreign Application Priority Data

Nov. 20, 2000 (JP) ........................................ 2000-353015

(51) Int. Cl.$^7$ .............................................. B60C 23/00
(52) U.S. Cl. ...................... 340/447; 340/432; 340/442; 340/445; 340/446
(58) Field of Search ................................ 340/447, 442, 340/445, 446, 432

(56) References Cited

U.S. PATENT DOCUMENTS

| | | | | |
|---|---|---|---|---|
| 3,185,960 A | * | 5/1965 | Howard | 340/58 |
| 3,787,806 A | * | 1/1974 | Church | 340/58 |
| 4,067,288 A | * | 1/1978 | Saito et al. | 23/4 |
| 4,071,724 A | * | 1/1978 | Lejeune | 23/4 |
| 4,160,234 A | * | 7/1979 | Karbo et al. | 340/58 |
| 4,235,184 A | * | 11/1980 | Schiavone | 23/4 |
| 4,494,106 A | * | 1/1985 | Smith et al. | 340/58 |
| 5,099,900 A | * | 3/1992 | Gomberg | 73/16 |
| 5,838,229 A | * | 11/1998 | Robinson, III | 340/442 |
| 6,160,474 A | * | 12/2000 | Tsunetomi et al. | 340/442 |
| 6,340,929 B1 | * | 1/2002 | Katou et al. | 340/447 |

FOREIGN PATENT DOCUMENTS

JP 10-44726 2/1998

* cited by examiner

*Primary Examiner*—Daniel J. Wu
*Assistant Examiner*—Son Tang
(74) *Attorney, Agent, or Firm*—Birch, Stewart, Kolasch & Birch, LLP (57) ABSTRACT

An air pressure detecting device serves to detect the air pressure of a wheel of a vehicle which has a tire tube disposed in a tire, the air pressure detecting device is disposed between the tire tube and the rim of the wheel portion for detecting the air pressure of the tire. The air pressure detecting device has a pressure bearing plate held in contact with the outer surface of the tire tube, a pressure sensor for detecting a pressure of the pressure bearing plate, and a detecting and transmitting unit for detecting pressure information from the pressure sensor, converting the pressure information into an electric signal, and transmitting the electric signal as a radio wave. The pressure bearing plate, the pressure sensor, and the detecting and transmitting unit are superposed in the order named. The components including the pressure bearing plate, the pressure sensor, and the detecting and transmitting circuit can be installed without the need for a special modification of the tire tube and the rim. As a result, the cost of the air pressure detecting device can be reduced.

4 Claims, 7 Drawing Sheets

AIR PRESSURE DETECTING DEVICE FOR WHEEL

CROSS-REFERENCE TO RELATED APPLICATIONS

The present application claims priority under 35 USC 119 to Japanese Patent Application No. 2000-353015 filed on Nov. 20, 2000 the entire contents thereof are hereby incorporated by reference.

BACKGROUND OF THE INVENTION

1. Field of the Invention

The present invention relates to an air pressure detecting device for a wheel for detecting the air pressure of a tire to allow the driver to recognize the air pressure of the tire even while the vehicle is being operated.

2. Description of Background Art

One air pressure detecting device for a wheel for allowing the driver to recognize the air pressure of a tire even while the vehicle is being operated is disclosed in Japanese Patent Laid-open No. Hei 10-44726 entitled "Tire Air Pressure Warning Device."

According to FIG. 1 of Japanese Patent Laid-open No. Hei 10-44726, the disclosed arrangement is a tire air pressure warning device that includes a valve stem 10 (the reference numeral is from the publication) mounted on a wheel rim 1. A case 2 is disposed beneath the valve stem 10 and a transmitter 7 is housed in the case 2. A pressure detector 3 is provided together with a signal processing circuit 4 and a cell 5.

While the above tire air pressure warning device is of a structure that can be mounted on a tubeless tire, it is not suitable for use on a tire with a tube.

In order to use the tire air pressure warning device on a tire with a tube, it is necessary to attach the transmitter 7 to the tire tube. However, the transmitter 7 cannot directly be attached to the tire tube.

SUMMARY OF THE INVENTION

It is therefore an object of the present invention to provide an air pressure detecting device for a wheel which can be mounted on a tire with a tube.

To achieve the above object, an air pressure detecting device according to the present invention provides for detecting the air pressure of a wheel of a vehicle which has a tire tube disposed in a tire with the air pressure detecting device being disposed between the tire tube and the rim of the wheel portion for detecting the air pressure of the tire. In the present invention the air pressure detecting device is held in contact with an outer surface of the tire tube.

The air pressure of the tire which is detected to provide effective drive information that can be known while the vehicle is being operated.

The air pressure detecting device for indicating the air pressure of the tire is disposed on the outer surface of the tire tube to allow the driver to know the air pressure of the tire even while the vehicle is being operated. Since the air pressure detecting device is of a structure that is held in contact with the outer surface of the tire tube, the air pressure detecting device can easily be mounted on an existing tire.

According to the present invention, the air pressure detecting device includes a pressure bearing plate held in contact with the outer surface of the tire tube, a pressure sensor for detecting a pressure of the pressure bearing plate, and a detecting and transmitting circuit for detecting pressure information from the pressure sensor, converting the pressure information into an electric signal, and transmitting the electric signal as a radio wave, the pressure bearing plate, the pressure sensor, and the detecting and transmitting circuit being superposed in the order named.

The pressure bearing plate, the pressure sensor, and the detecting and transmitting circuit are interposed between the tire tube and the rim of the wheel portion for indicating the air pressure of the tire, and detects the outer pressure of the tire tube for the driver to know the air pressure of the tire while the vehicle is being operated.

Since the components including the pressure bearing plate, the pressure sensor, and the detecting and transmitting circuit are interposed between the tire tube and the rim of the wheel portion and superposed in the order named, these components can be installed without the need for a special modification of the tire tube and the rim. The structure is simplified by superposing the pressure bearing plate, the pressure sensor, and the detecting and transmitting circuit in the order named.

The components do not need to be replaced but can be used continuously when the tire is replaced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention will be described below with reference to the accompanying drawings. The terms "front," "rear," "left," "right," "upper," and "lower"

are used to refer to the directions as viewed from the driver, and "Fr" represents front, "Rr" represents rear, "L" represents left, and "R" represents right. The figures should be viewed in the direction in which the reference characters.

Figure 1:
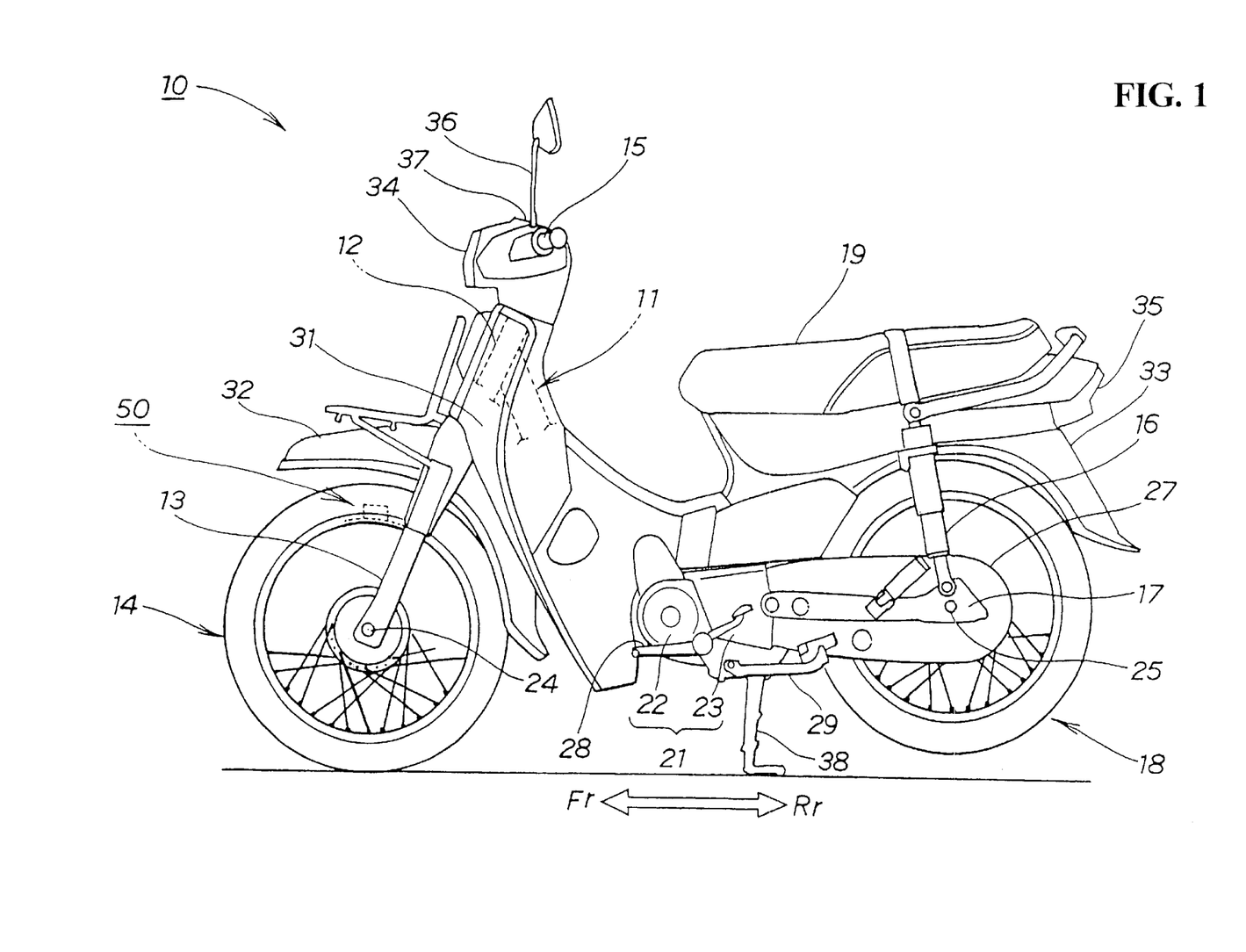
FIG. 1 is a side elevational view of a motorcycle which incorporates an air pressure detecting device for a wheel according to the present invention.

FIG. 1 is a side elevational view of a motorcycle which incorporates an air pressure detecting device for a wheel according to the present invention. The motorcycle 10 is an engine-operated motorcycle having, as major components, a chassis frame 11 extending rearwardly and downwardly of the vehicle. A head pipe 12 is mounted on the chassis frame 11. A front fork 13 is mounted on the head pipe 12. A front wheel 14 is mounted on the front fork 13 with a handle 15 connected to the front fork 13. A rear suspension 16 includes an end attached to a rear upper portion of the chassis frame 11. A swing arm 17 is swingably connected between the other end of the rear suspension 16 and a rear lower portion of the chassis frame 11. A rear wheel 18 is mounted on the distal end of the swing arm 17. A seat 19 is mounted on the rear upper portion of the chassis frame 11 and a power unit 21 is disposed beneath the chassis frame 11 and includes an engine 22 and a transmission 23.

In FIG. 1, the motorcycle also includes axles 24, 25, a drive chain cover 27, a brake pedal 28, a kick pedal 29, a leg shield 31, a front fender 32, a rear fender 33, a head lamp 34, a tail lamp 35, a rear-view mirror 36, an instrumental panel 37, and a stand 38.

An air pressure detecting device 50 for a wheel serves to detect the air pressure of a tire and allows the driver to recognize the air pressure of the tire even while the vehicle is being operated.

Figure 2:
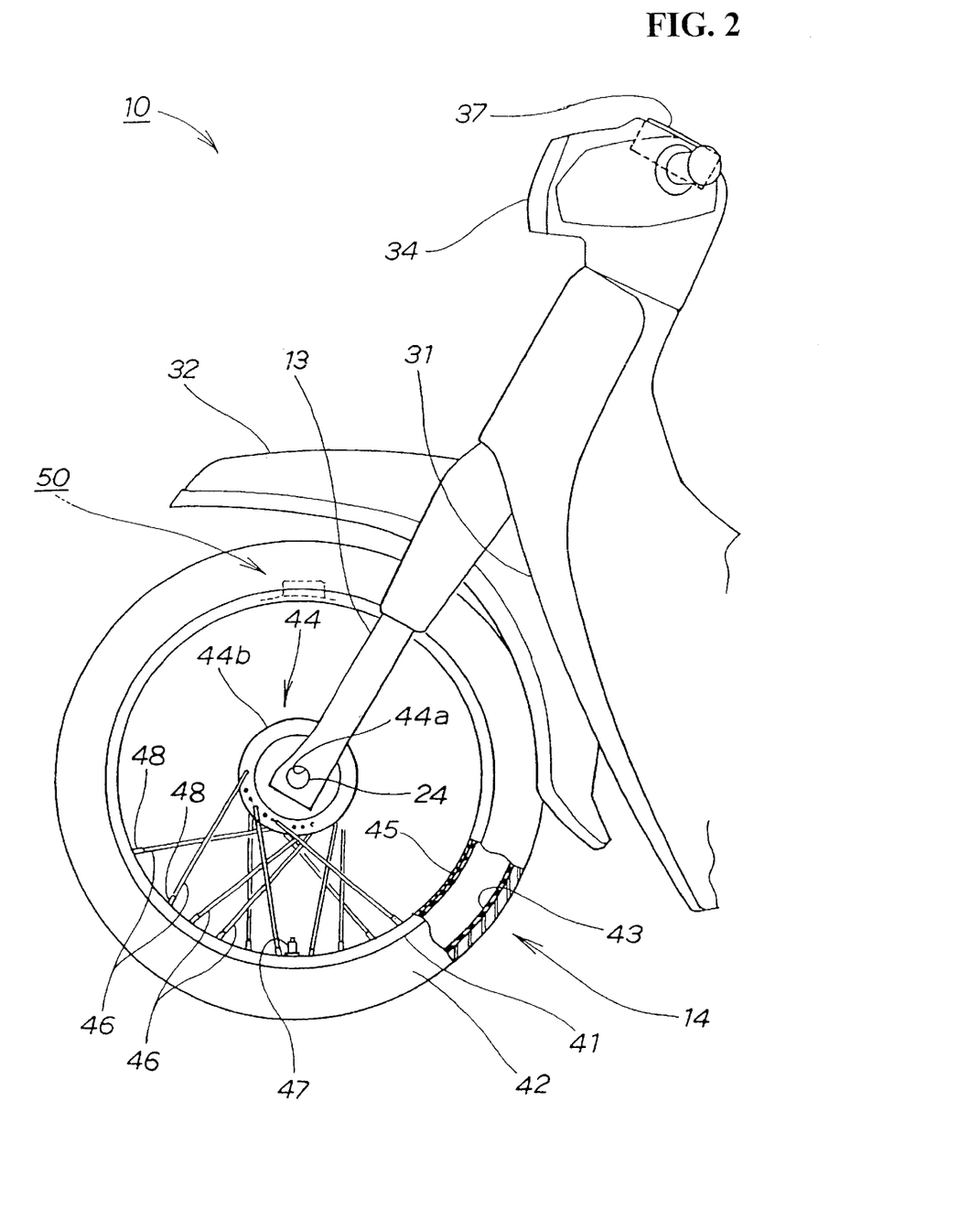
FIG. 2 is a side elevational view of a front portion of the motorcycle which incorporates the air pressure detecting device for a wheel according to the present invention.

FIG. 2 is a side elevational view of a front portion of the motorcycle which incorporates the air pressure detecting device for a wheel according to the present invention.

The wheel 14 comprises a disk-shaped wheel portion 41, a tire 42 mounted on the wheel portion 41, and a tire tube 43 accommodated between the wheel portion 41 and the tire 42. The air pressure detecting device 50 is interposed between the tire tube 43 and the wheel portion 41.

The tire tube 43 has an air valve 47 for introducing air thereinto.

Figure 3:
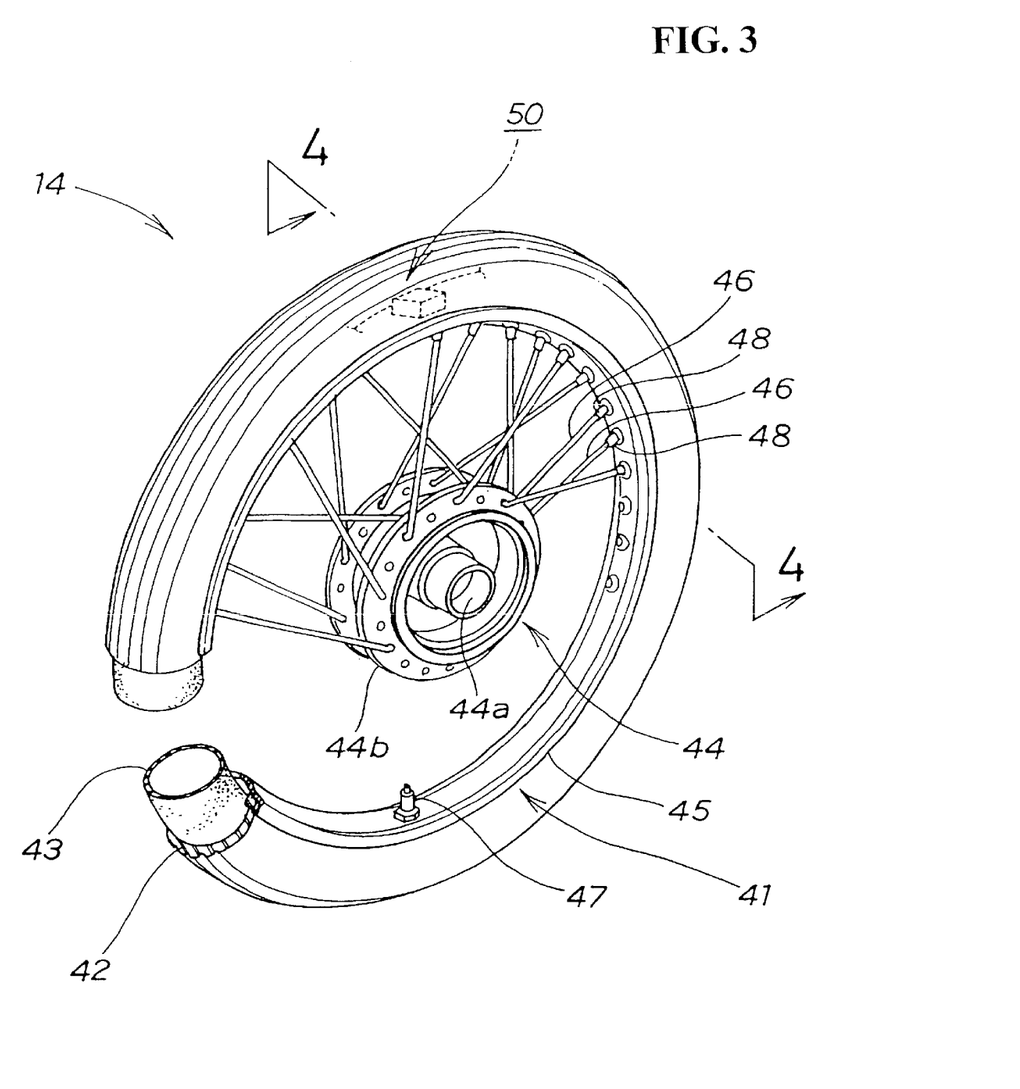
FIG. 3 is a perspective view of a wheel which incorporates the air pressure detecting device for a wheel according to the present invention.

FIG. 3 is a perspective view of the wheel which incorporates the air pressure detecting device for a wheel according to the present invention. The wheel portion 41 comprises a hub 44 rotatably mounted on the axle 24, a rim 45 on which the tire 42 is mounted, and a plurality of spokes 46 . . . ( . . . indicates a plurality) interconnecting the rim 45 and the hub 44.

The hub 44 comprises a bearing member 44a fitted over the axle 24 with a bearing (not shown) interposed therebetween. Disks 44b . . . are provided that engage the spokes 46. The rim 45 includes an air valve 47 for introducing air into the tire 42.

The spokes 46 include ends engaging the disks 44b of the hub 44 and distal ends attached to the rim 45 by nipples 48. Thus, the spokes 46 integrally coupling the rim 45 and the hub 44 to each other.

The rear wheel 18 shown in FIG. 1 is essentially identical to the front wheel 14, and will not be described in detail below.

Figure 4:
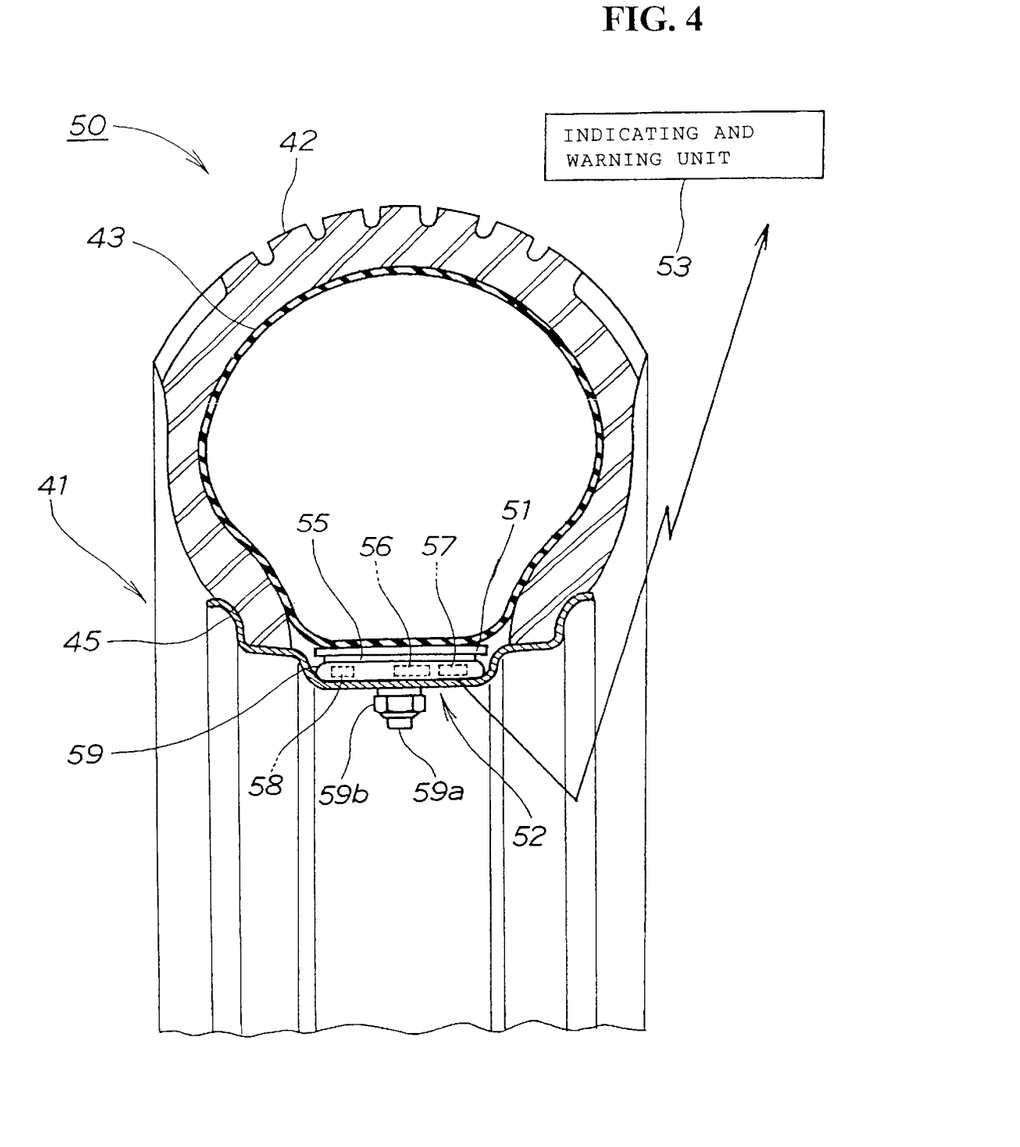
FIG. 4 is a cross-sectional view taken along line 4—4 of FIG. 3.

FIG. 4 is a cross-sectional view taken along line 4—4 of FIG. 3, showing a sectional front elevation of the air pressure detecting device 50.

The air pressure detecting device 50 comprises a pressure bearing plate 51 disposed on the outer surface of the tire tube 43, a pressure sensor 55 for detecting the pressure of the pressure bearing plate 51, a detecting and transmitting unit 52 as a detecting and transmitting circuit for detecting pressure information from the pressure sensor 55, converting the pressure information into an electric signal, and transmitting the electric signal as a radio wave, and an indicating and warning unit 53 for receiving the pressure information from the detecting and transmitting unit 52 and indicating the pressure information or issuing a warning. The pressure bearing plate 51, the pressure sensor 55, and the detecting and transmitting unit 52 are superposed in the order named in a radial direction from the rim 45 toward the tire tube 43. The detecting and transmitting unit 53 is a unit mounted on the instrumental panel 37 (see FIG. 2) as described hereinafter.

The detecting and transmitting unit 52 comprises a pressure sensor 55 for detecting a tire pressure. A detecting circuit 56 is provided that is connected to the pressure sensor 55 for extracting the pressure information as an electric signal. A transmitting circuit 57 is provided for transmitting the electric signal from the detecting circuit 56 as a radio wave. A cell 58 energizes the detecting circuit 56 and the transmitting circuit 57. A case 59 provides a housing for the pressure sensor 55, the detecting circuit 56, the transmitting circuit 57 and the cell 58.

The case 59 has a threaded shaft 59a for attaching the case 59 to the rim 45 with a nut 59b threaded over the threaded shaft 59a.

The air pressure detecting device 50 is used with the wheel of the vehicle which has the tire tube 43 disposed in the tire 42, the air pressure detecting device 50 being disposed between the tire tube 43 and the rim 45 of the wheel portion 41 for detecting the air pressure of the tire 42. The air pressure detecting device 50 has the pressure bearing plate 51 held in contact with the outer surface of the tire tube 43, the pressure sensor 55 for detecting the pressure of the pressure bearing plate 51 and the detecting and transmitting unit 52 for detecting pressure information from the pressure sensor 55, converting the pressure information into an electric signal, and transmitting the electric signal as a radio wave. The pressure bearing plate 51, the pressure sensor 55, and the detecting and transmitting unit 52 are superposed in the order named.

The air pressure of the tire which is detected provides effective driving information when the pressure is known while the vehicle is being operated. The air pressure detecting device 50 includes the pressure bearing plate 51, the pressure sensor 55, and the detecting and transmitting unit 52 interposed between the tire tube 43 and the rim 45 of the wheel portion 41 for indicating the tire pressure, and for detecting the outer pressure of the tire tube 43 to allow the driver to know the air pressure of the tire even while the vehicle is being operated.

The pressure bearing plate 51, the pressure sensor 55, and the detecting and transmitting unit 52 are interposed and superposed in the order named between the tire tube 43 and the rim 45 of the wheel portion 41 for indicating the tire pressure. The components including the pressure sensor 55 and the detecting and transmitting unit 52 can be installed without the need for a special modification of the tire tube 43 and the rim 45. The structure of the air pressure detecting device 50 is simplified by superposing the pressure bearing plate 51, the pressure sensor 55, and the detecting and transmitting unit 52 in the order named between the tire tube 43 and the rim 45. As a result, the cost of the air pressure detecting device 50 is lowered.

The above components do not need to be replaced when the tire is replaced. As a result, the air pressure detecting device 50 can continuously be used for material saving.

Stated otherwise, the air pressure detecting device 50 serves to detect the air pressure of the wheel of the vehicle which has the tire tube 43 disposed in the tire 42, the air pressure detecting device 50 being disposed between the tire tube 43 and the rim 45 of the wheel portion 41 for detecting the air pressure of the tire, the air pressure detecting device 50 being held in contact with an outer surface of the tire tube 43.

Since the air pressure detecting device 50 is of a structure that is held in contact with the outer surface of the tire tube 43, the air pressure detecting device 50 can easily be mounted on an existing tire. As a consequence, the air pressure detecting device 50 can find a wider range of applications.

Figure 5:
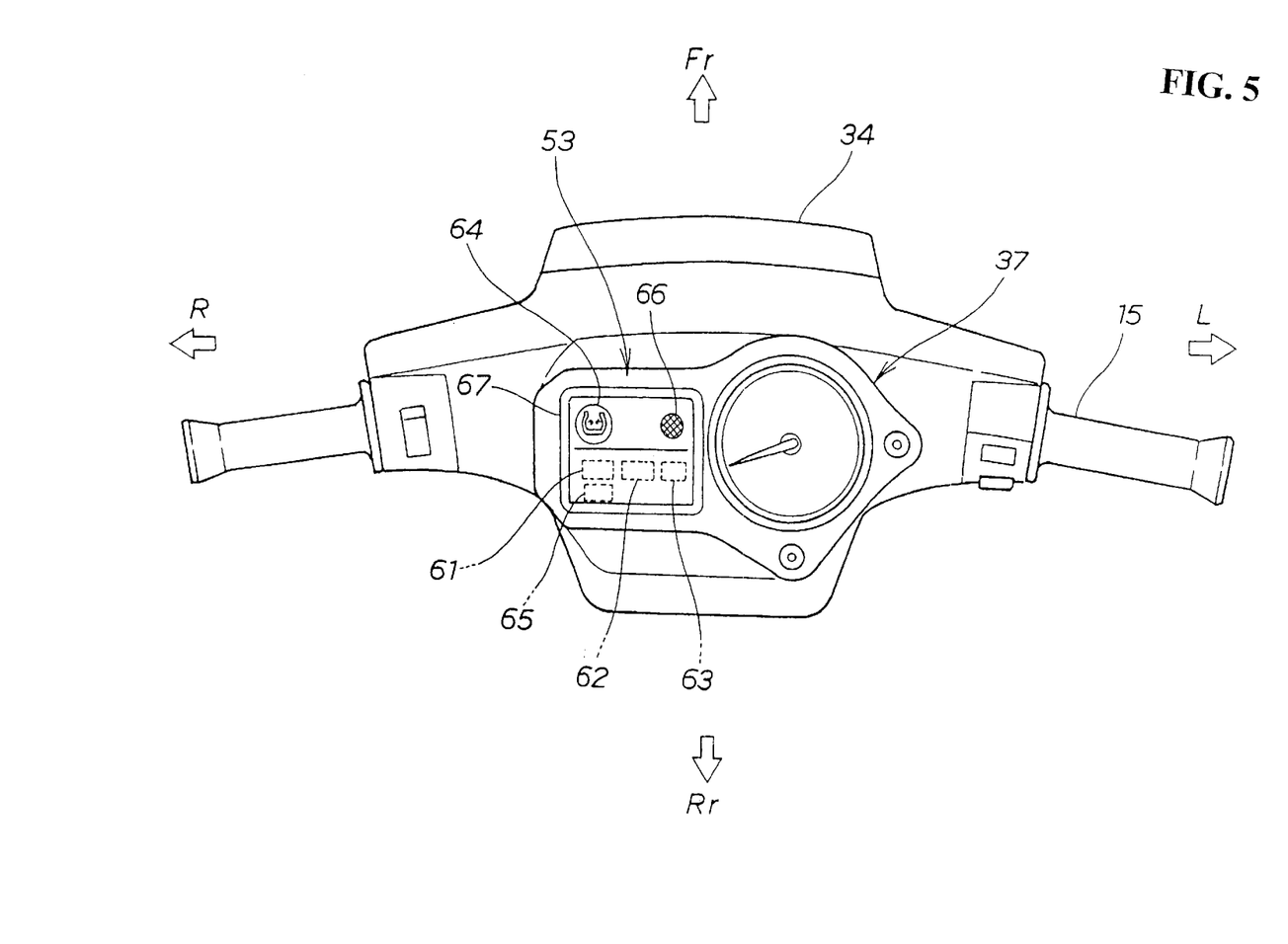
FIG. 5 is a plan view of an indicating and warning unit of the air pressure detecting device according to the present invention.

FIG. 5 is a plan view of the indicating and warning unit of the air pressure detecting device according to the present invention, showing the instrumental panel 37 mounted on the handle 15.

The indicating and warning unit 53 is mounted on the instrumental panel 37, and comprises a receiving circuit 61 for receiving a radio wave transmitted from the detecting and transmitting unit 52 shown in FIG. 3. A voltage amplifying circuit 62 is provided for amplifying a signal received by the receiving circuit 61. An indicating circuit 63 is provided for indicating a tire pressure based on a voltage value amplified by the voltage amplifying circuit 62. An indicating means 64 is energizable by the indicating circuit 63. A warning activating circuit 65 is operable when the voltage value, amplified by the voltage amplifying circuit 62, is lower than a predetermined voltage value. A warning means 66 is energizable by the warning activating circuit 65. A housing 67 is provided for housing the receiving circuit 61, the voltage amplifying circuit 62, indicating circuit 63, the indicating means 64, the warning activating circuit 65, and the warning means 66.

Operation of the air pressure detecting device 50 as described above will be described below.

Figure 6:
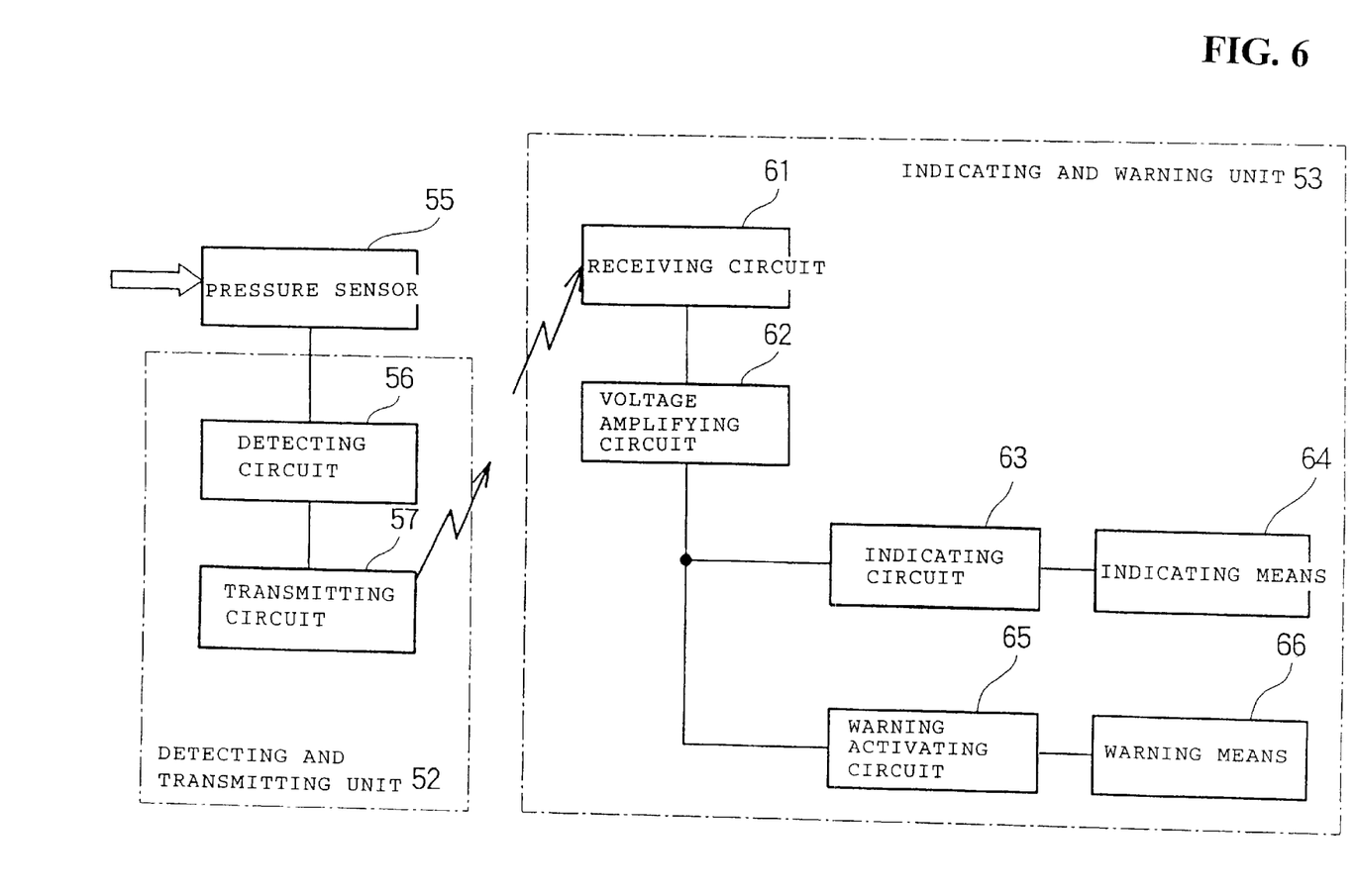
FIG. 6 is a block diagram of an air pressure detecting device for a wheel according to the present invention.

FIG. 6 is a block diagram of the air pressure detecting device for a wheel according to the present invention. The pressure sensor 55 detects a tire pressure, and the detecting circuit 56 extracts pressure information as an electric signal. The transmitting circuit 57 transmits the electric signal to the indicating and warning unit 53.

The radio wave transmitted from the detecting and transmitting unit 52 is received by the receiving circuit 61, and a signal received by the receiving circuit 61 is amplified by the voltage amplifying circuit 62. In order to indicate the tire pressure based on a voltage value amplified by the voltage amplifying circuit 62, the indicating circuit 63 converts the voltage value into a given signal, and the indicating means 64 indicates the tire pressure.

When the voltage value amplified by the voltage amplifying circuit 62 is lower than a predetermined voltage value, the warning activating circuit 65 is operated to cause the warning means 66 to indicate a lack of tire pressure.

Figure 7:
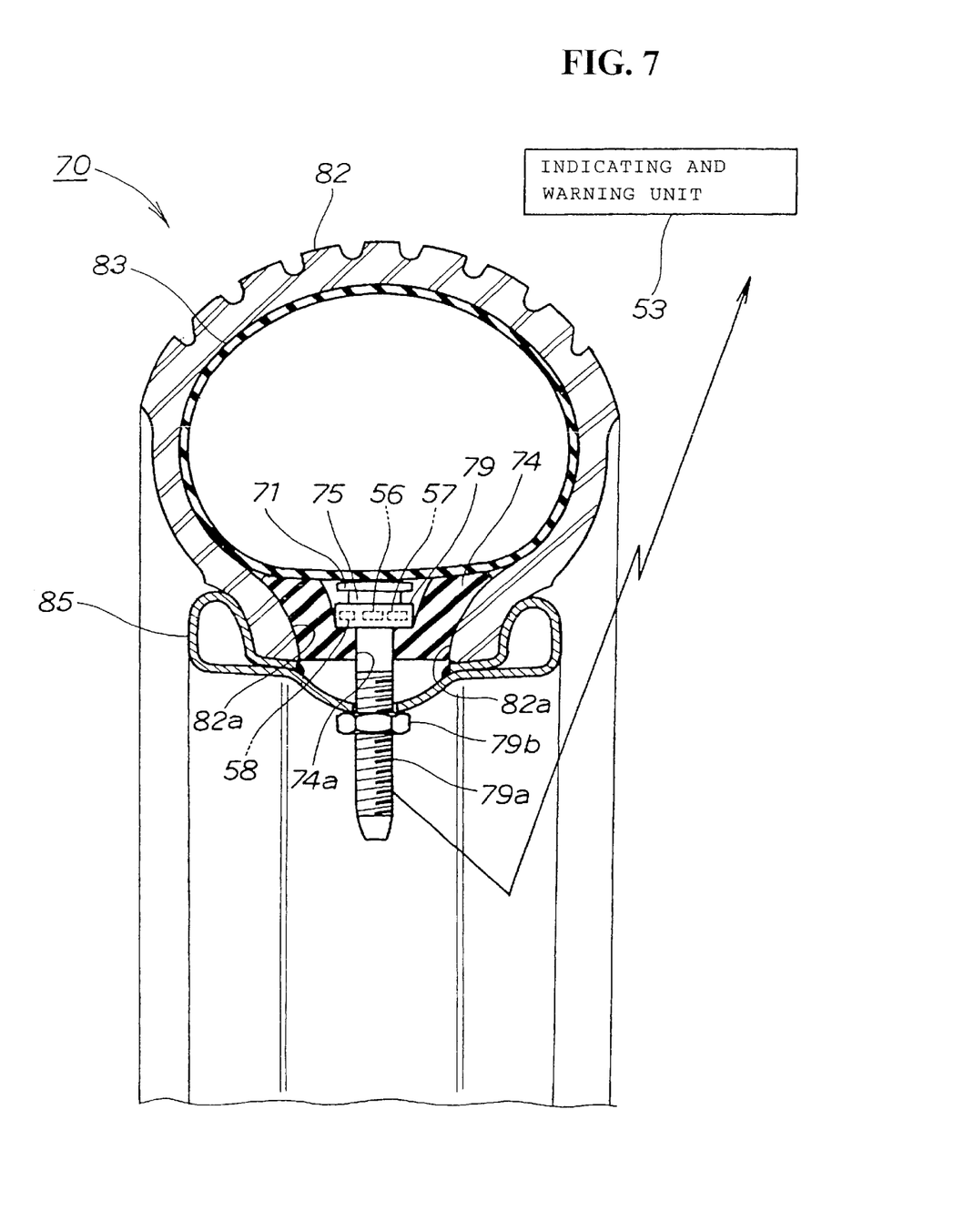
FIG. 7 is a side elevational view of an air pressure detecting device for a wheel according to a second embodiment of the present invention.

FIG. 7 is a side elevational view of an air pressure detecting device for a wheel according to a second embodiment of the present invention. The parts of the air pressure detecting device according to the second embodiment which are identical to the parts of the air pressure detecting device 50 (see FIG. 4) are denoted by identical reference characters, and will not be described in detail below.

An air pressure detecting device 70 comprises a pressure bearing plate 71 disposed on the outer surface of the tire tube 83, a pressure sensor 75 for detecting the pressure of the pressure bearing plate 71, a detecting and transmitting unit 72 as a detecting and transmitting circuit for detecting pressure information from the pressure sensor 75, converting the pressure information into an electric signal, and transmitting the electric signal as a radio wave, a bead stopper 74 for holding beads 82a of a tire 82, and an indicating and warning unit 53 for receiving the pressure information from the detecting and transmitting unit 72 and indicating the pressure information or issuing a warning. The pressure bearing plate 71, the pressure sensor 75, the detecting and transmitting unit 72, and the bead stopper 74 are superposed in the order named in a radial direction from a rim 85 toward a tire tube 83.

The detecting and transmitting unit 72 comprises a detecting circuit 56 connected to the pressure sensor 75 for extracting the pressure information as an electrical signal, a transmitting circuit 57 for transmitting the electrical signal from the detecting circuit 56 as a radio wave. A cell 58 is provided for energizing the detecting circuit 56 and the transmitting circuit 57. A case 59 is provided for housing the detecting circuit 56, the transmitting circuit 57, and the cell 58, and an elongate threaded shaft 79a extending from the case 79. The threaded shaft 79a extends through a through hole 74a, and a nut 79b attaches the threaded shaft 79 to the rim 85.

The air pressure detecting device 70 serves as an air pressure detecting device with a bead stopping function. Since the threaded shaft 79a is elongate, the threaded shaft 79a can be used as an antenna of the transmitting circuit 57.

Because the air pressure detecting device 70 has an additional bead stopper or antenna function, it can save more space than if these functions were separately provided, and it can reduce the cost of its parts.

In the above embodiments, the vehicle has been described as the motorcycle 10 as shown in FIG. 1. However, the vehicle is not limited to a two-wheel vehicle. The vehicle may be a four-wheel vehicle or a three-wheel vehicle.

In the above embodiment, the indicating means 64 and the warning means 66 are mounted on the instrumental panel 37 as shown in FIG. 4. However, they may be incorporated in the chassis frame or in a helmet if they issue a warning, or may be incorporated in the seat or a helmet if they apply vibrations. While the indicating and warning unit 53 has been described as a unit for the front wheel 14 (see FIG. 1), it may also be used as a unit for indicating a tire pressure or issuing a warning for the rear wheel 18 (see FIG. 1).

The present invention thus arranged offers the following effects:

According to the present invention, there is provided an air pressure detecting device for detecting the air pressure of a wheel of a vehicle which has a tire tube disposed in a tire. The air pressure detecting device is disposed between the tire tube and the rim of the wheel portion for detecting the air pressure of the tire. The air pressure detecting device is held in contact with an outer surface of the tire tube. As a result, the air pressure detecting device can easily be mounted on an existing tire.

According to the present invention, there is provided air pressure detecting device for detecting the air pressure of a wheel of a vehicle which has a tire tube disposed in a tire. The air pressure detecting device is disposed between the tire tube and the rim of the wheel portion for detecting the air pressure of the tire. The air pressure detecting device includes a pressure bearing plate held in contact with the outer surface of the tire tube, a pressure sensor for detecting a pressure of the pressure bearing plate, and a detecting and transmitting circuit for detecting pressure information from the pressure sensor, converting the pressure information into an electric signal, and transmitting the electric signal as a radio wave, the pressure bearing plate, the pressure sensor, and the detecting and transmitting circuit being superposed in the order named. The components including the pressure bearing plate, the pressure sensor, and the detecting and transmitting circuit can be installed without the need for a special modification of the tire tube and the rim. As a result, the cost of the air pressure detecting device can be reduced.

When the tire is replaced, the above components do not need to be replaced. As a consequence, the components can be used continuously for material saving.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air pressure detecting apparatus for detecting air pressure of a tire of a vehicle, comprising:

a wheel including a rim, a tire, and a tire tube disposed within the tire;

an air pressure detecting device being disposed between the tire tube and the rim of the wheel for detecting the air pressure of the tire, said air pressure detecting device being held in contact with an outer surface of said tire tube for detecting the air pressure of the tire;

a pressure bearing plate held in contact with the outer surface of said tire tube;

a pressure sensor detector for detecting pressure of said pressure bearing plate;

a detecting and transmitting circuit including a detecting circuit that is connected to the pressure sensor for extracting pressure information, including the air pressure of the tire, as an electrical signal and a transmitting circuit for transmitting the electrical signal from the detecting circuit as a radio wave;

a case for positioning the pressure bearing plate, the pressure sensor, and the detecting and transmitting circuit radially superposed, face to face, in the order named; and a threaded shaft mounted on said case for attaching said case to the rim of the wheel, wherein the threaded shaft is used as an antenna of the transmitting circuit.

2. The air pressure detecting apparatus according to claim 1, wherein said air pressure detecting device is flat and corresponds to the width of the rim of the wheel for mounting the air pressure detecting device adjacent to the outer surface of the tire tube.

3. An air pressure detecting apparatus for detecting air pressure of a tire of a vehicle, comprising:

a wheel including a rim, a tire, and a tire tube disposed within a tire;

an air pressure detecting device being disposed between the tire tube and the rim of the wheel for detecting the air pressure of the tire, said air pressure detecting device being held in contact with an outer surface of said tire tube for detecting the air pressure of the tire;

a bead stopper for holding a bead of the tire adjacent to the air pressure detecting device;

a pressure bearing plate held in contact with the outer surface of said tire tube;

a pressure sensor detector for detecting pressure of said pressure bearing plate; and a detecting and transmitting circuit including a detecting circuit that is connected to the pressure sensor for extracting pressure information, including the air pressure of the tire, as an electrical signal and a transmitting circuit for transmitting the electrical signal from the detecting circuit as a radio wave;

a case for positioning the pressure bearing plate, the pressure sensor, the detecting and transmitting circuit, and the bead stopper radially superposed, face to face, in the order named within the case; and a threaded shaft mounted on said case for attaching said case to the rim of the wheel, wherein the threaded shaft is used as an antenna of the transmitting circuit.

4. An air pressure detecting apparatus for detecting air pressure of a tire of a vehicle during operation of the vehicle, comprising:

a wheel including a rim, a tire, and a tire tube disposed within the tire;

an air pressure detecting device being disposed between the tire tube and the rim of the wheel for detecting the air pressure of the tire during operation of the vehicle, said air pressure detecting device being held in contact with an outer surface of said tire tube for detecting the air pressure of the tire during operation of the vehicle;

a pressure bearing plate held in contact with the outer surface of said tire tube;

a pressure sensor detector for detecting pressure of said pressure bearing plate; and a detecting and transmitting circuit including a detecting circuit that is connected to the pressure sensor for extracting pressure information, including the air pressure of the tire, as an electrical signal and a transmitting circuit for transmitting the electrical signal from the detecting circuit as a radio wave;

a case for positioning the pressure bearing plate, the pressure sensor, and the detecting and transmitting circuit radially superposed, face to face, in the order named within the cases; and a threaded shaft mounted on said case for attaching said case to the rim of the wheel, wherein the threaded shaft is used as an antenna of the transmitting circuit.

* * * * *